(12) United States Patent
Evans et al.

(10) Patent No.: US 7,324,297 B2
(45) Date of Patent: Jan. 29, 2008

(54) DATA STORAGE APPARATUS AND METHOD

(75) Inventors: Nigel Ronald Evans, Bristol (GB); Andrew Malcolm George Clarke, Bristol (GB); John Mark Mackelden, Chippenham (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 113 days.

(21) Appl. No.: 11/236,052

(22) Filed: Sep. 27, 2005

(65) Prior Publication Data

US 2006/0114592 A1   Jun. 1, 2006

(30) Foreign Application Priority Data

Oct. 2, 2004   (GB) .................. 0421950.7

(51) Int. Cl.
*G11B 19/02* (2006.01)
(52) U.S. Cl. ........................................ 360/69
(58) Field of Classification Search ............ None
See application file for complete search history.

(56) References Cited

U.S. PATENT DOCUMENTS

| | | | |
|---|---|---|---|
| 5,287,478 A * | 2/1994 | Johnston et al. ............ 711/111 |
| 5,367,410 A * | 11/1994 | McCarthy .................... 360/48 |
| 5,774,288 A | 6/1998 | Kikuchi et al. |
| 5,852,534 A | 12/1998 | Ozue et al. |
| 5,862,008 A * | 1/1999 | Yamada et al. ............... 360/69 |
| 6,172,829 B1 * | 1/2001 | Ozaki et al. .................. 360/48 |
| 6,285,518 B1 | 9/2001 | Zweighaft |
| 6,493,166 B1 * | 12/2002 | Takayama .................... 360/69 |
| 6,624,959 B1 * | 9/2003 | Takayama .................... 360/69 |

FOREIGN PATENT DOCUMENTS

| | | |
|---|---|---|
| EP | 0 386 362 A2 | 9/1990 |
| EP | 0 509 637 A2 | 10/1992 |
| EP | 0 630 022 A2 | 12/1994 |

* cited by examiner

*Primary Examiner*—K. Wong

(57) ABSTRACT

Data storage apparatus is provided for storing data on a tape in accordance with a format specifying a plurality of logs of tape-usage information and a data area for storing the data. Control means are programmed to update one of the logs for each usage of the tape, the logs being selected in turn for updating.

18 Claims, 4 Drawing Sheets

DATA STORAGE APPARATUS AND METHOD

FIELD OF THE INVENTION

The present invention relates to storing data on a tape in accordance with a format in which tape usage information is logged on the tape.

BACKGROUND OF THE INVENTION

It is known to provide the storage and retrieval of digital information on magnetic tape in a format that is referred to as the DDS format which has developed through a number of versions. In a DDS tape drive, a magnetic tape cassette is loaded into the tape drive and the tape in the cassette is transported past a rotary head drum to record overlapping oblique tracks across the tape. The DDS format provides for a number of specific areas on the tape including a device area for loading and testing the tape, a system area that includes a tape log and a data area for recording user data. The tape log is provided to record tape usage information. The tape log is read when a tape cassette is loaded into the tape drive and the tape log is updated by being overwritten when the tape cassette is unloaded.

If problems occur during an update of the tape log, due to a head clog or a power cycle failure, then the log can be corrupted rendering it useless on subsequent tape loading operations. In addition, if the tape drive has had problems in writing data to the tape, it may be considered too risky to attempt an update of the tape log for fear of corrupting the log. In this case the cassette may be ejected without the current tape usage information being added to the log.

SUMMARY OF THE INVENTION

According to the present invention, there is now provided data storage apparatus for storing data on a tape, the apparatus comprising;

recording means to load the tape for a data recording session and to unload the tape following the data recording session, the recording means being operable to record the data in accordance with a format specifying a system area of the tape for storing a plurality of logs of tape-usage information, and a data area of the tape for storing the said data, and control means programmed to access the data in one of the said logs for use at each loading of the tape and to update one of the said logs at each unloading of the tape, the control means being programmed to select the most recently updated log to be accessed at each loading of the tape and to update the least recently updated log at each unloading.

Further according to the present invention, there is provided a method of storing data on a tape by means of data storage apparatus operable to load the tape for a data recording session and to unload the tape following the data recording session, the method comprising the steps of;

recording the data in accordance with a format specifying a system area of the tape for storing a plurality of logs of tape-usage information, and a data area of the tape for storing the said data, and accessing the data in one of the said logs for use at each loading of the tape and updating one of the said logs at each unloading of the tape, the most recently updated log being accessed for use at each loading of the tape and the least recently updated log being updated at each unloading of the tape.

DESCRIPTION OF THE DRAWINGS

The invention will now be described, by way of example only, by reference to the accompanying drawings in which.

DETAILED DESCRIPTION OF THE INVENTION

Figure 1:
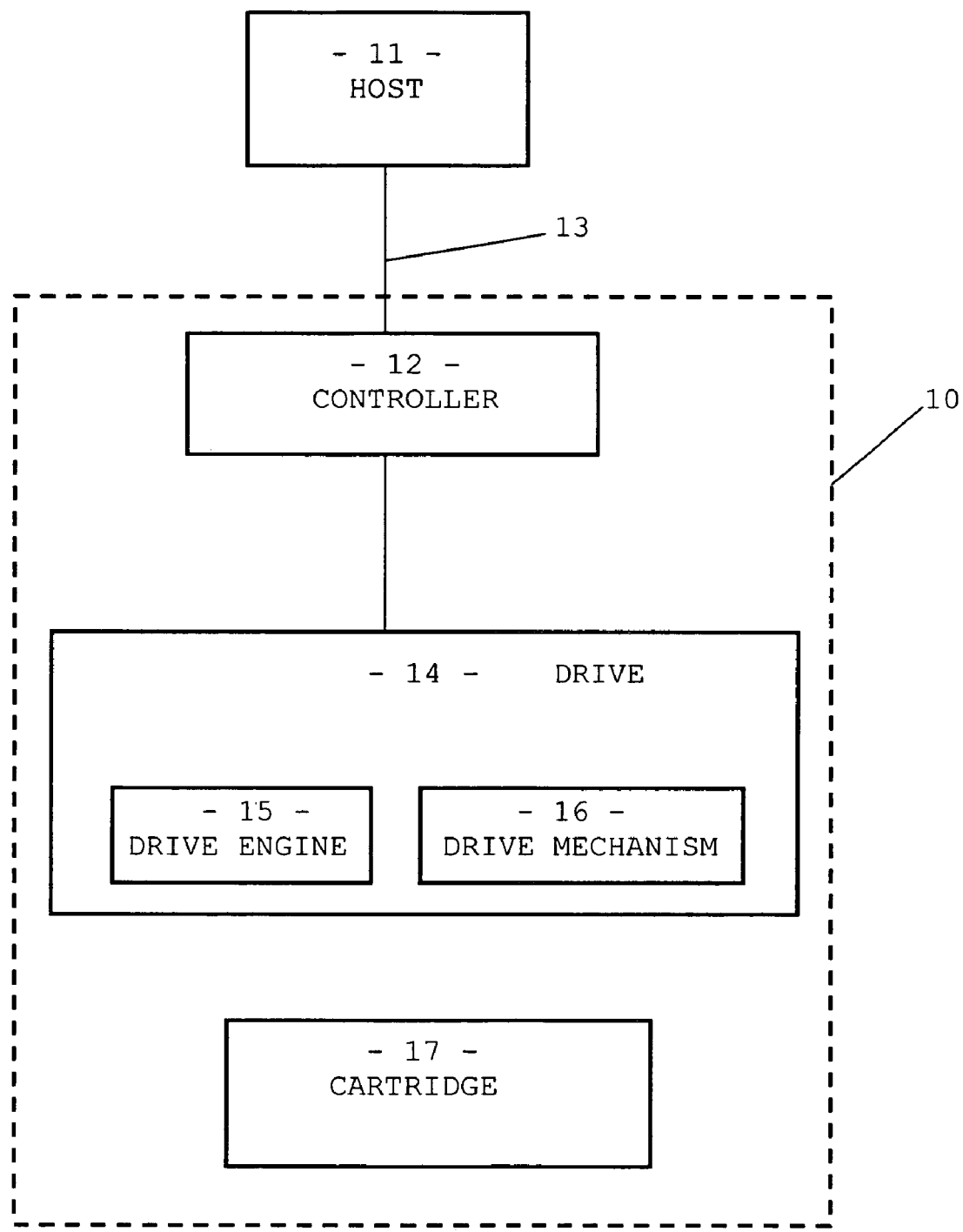
FIG. 1 shows a block diagram of the components of a magnetic tape recording system embodying the present invention.

Referring to FIG. 1, there is shown a data storage system 10 embodying the present invention. The system includes a host 11 coupled to a controller 12 via an interface 13. The controller 12 is programmed to control a tape drive 14 that includes a drive engine 15 and a drive mechanism 16. The drive mechanism is adapted to receive a tape cartridge 17. A controlling software application on the host 11 controls the reading and writing of data on a magnetic data tape in the tape cartridge 17.

The host system 11 has at least one central processing unit (CPU) and a memory to store the controlling software application. The interface 13 connecting the host system 11 to the controller 12 may be any suitable proprietary standard bus known to those skilled in the art.

The drive mechanism 16 includes electrical and mechanical components that receive, position and access tape cartridges. The drive mechanism has components to lock a tape cartridge in place, an ejection motor and read/write heads. The drive engine 15 is a data processor that is programmed to supervise the operations of the drive mechanism 16 and to manage the flow of data to be recorded in or read from a tape cartridge 17 received in the drive 14.

Figure 2:
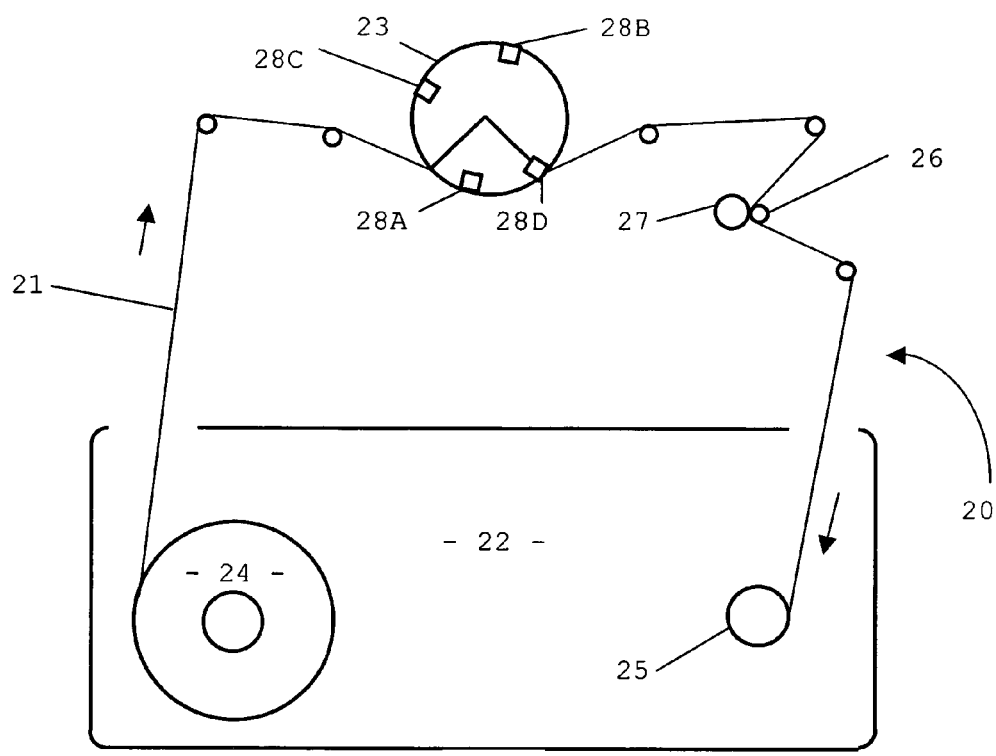
FIG. 2 shows the main physical components of a tape deck included in the system of FIG. 1.
Figure 3:
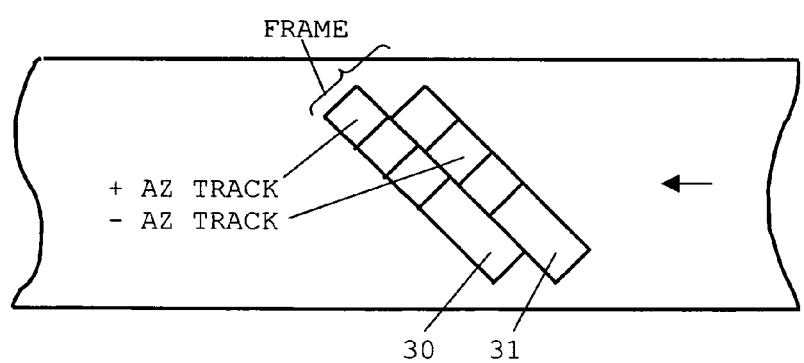
FIG. 3 is a diagrammatic representation of two data tracks recorded on a tape by means of the tape deck of FIG. 2, FIGS. 4 and 5 are diagrams showing the overall layout of a tape recorded in accordance with the present invention.

Referring to FIG. 2, there is shown the basic layout of the tape drive 14 which is in the form of a helical scan tape deck 20 in which tape 21 from a tape cartridge 22 passes at an angle across a rotary head drum 23. The tape is driven in the direction indicated by the arrows from a motor driven supply reel 24 to a motor driven take up reel 25. A capstan 26 and pinch roller 27 control the passage of the tape past the head drum 23. The rotary head drum 23 carries two magnetic write heads 28A and 28B spaced apart by 180° and two read heads 28C and 28D also spaced apart by 180°. The heads 28A and 28B are arranged to write a succession of overlapping oblique data tracks 30, 31 on the tape as shown in FIG. 3. The two tracks 30, 31 are representative of a succession of tracks along the tape that are recorded according to a DDS format. The track written by the head 28A has a positive azimuth while the track written by the head 28B has a negative azimuth. Each pair of positive and negative azimuth tracks 30,31 constitutes a frame.

Figure 4:
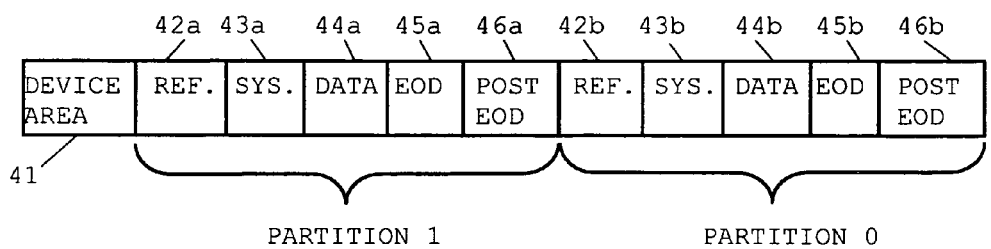

The tape 21 may formatted so as to have a single space for data or may be formatted as a partitioned tape in which data may be recorded in one partition independently of data recorded in another partition on the tape. The present invention may be applied to either a single data space tape or a partitioned tape but for convenience will be described in relation to a partitioned tape. FIG. 4 shows the overall layout of the tape 21 when it is formatted as a two-partition tape. The two partitions are referred to as partition 1 and partition 0, the partition 0 being, by convention, the furthest from the start of the tape 21. In addition to the partitions themselves, there is an initial area 41 of the tape that is referred to as a device area that is used in the initial setting up of the tape 21.

The layout of partition 1 of the tape 21 consists of 5 areas that comprise a reference area 42a, a system area 43a, a data area 44a, an end of data area 45a and a post end of data area 46a. The partition 0 also has a reference area 42b, a system area 43b, a data area 44b, an end of data area 45b and a post end of data area 46b.

The reference areas 42a and 42b are each used as a physical reference. The system area 43a of partition 1 includes two system logs that are updated by being overwritten as will be described more fully below. The system area 43b of partition 0 does not include system logs but has system frames that are written as a continuum upon tape format and are not overwritten until the next tape format. The data areas 44a and 44b are used for recording user data and are followed by the end of data areas 45a and 45b and the post end of data areas 46a and 46b.

Figure 5:
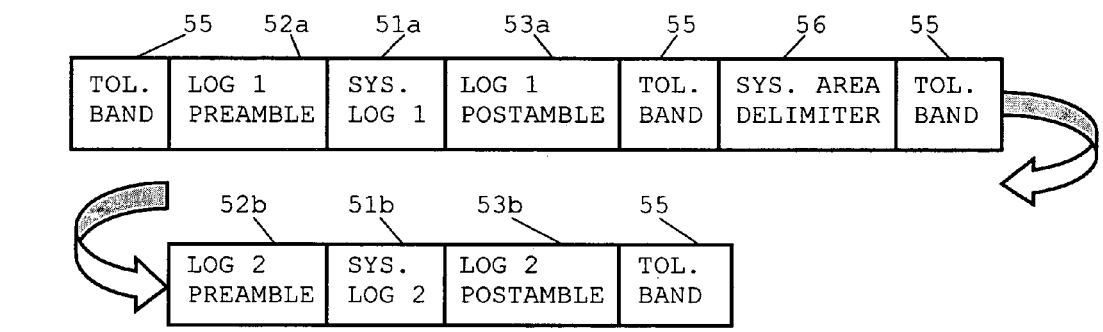

FIG. 5 shows the layout of the two system logs 51a and 51b in the system area 43a of the tape 21. The two logs 51a and 51b are referred to as system log 1 and system log 2 respectively. The system logs 1 and 2 are preceded by respective preambles 52a and 52b and followed by respective postambles 53a and 53b. Position tolerance bands 55 are provided to accommodate positioning tolerances when updating the system logs. A system area delimiter 56 is used as the physical reference when updating the system log 2.

Each of the system logs includes cyclic redundancy check (CRC) characters to enable the contents of the log to be validated. The system logs also each include a tape load count. The load count of the log in current use is updated upon each load of the tape so that the load counts can be compared so as to determine which of the logs is the most recent.

Figure 6:
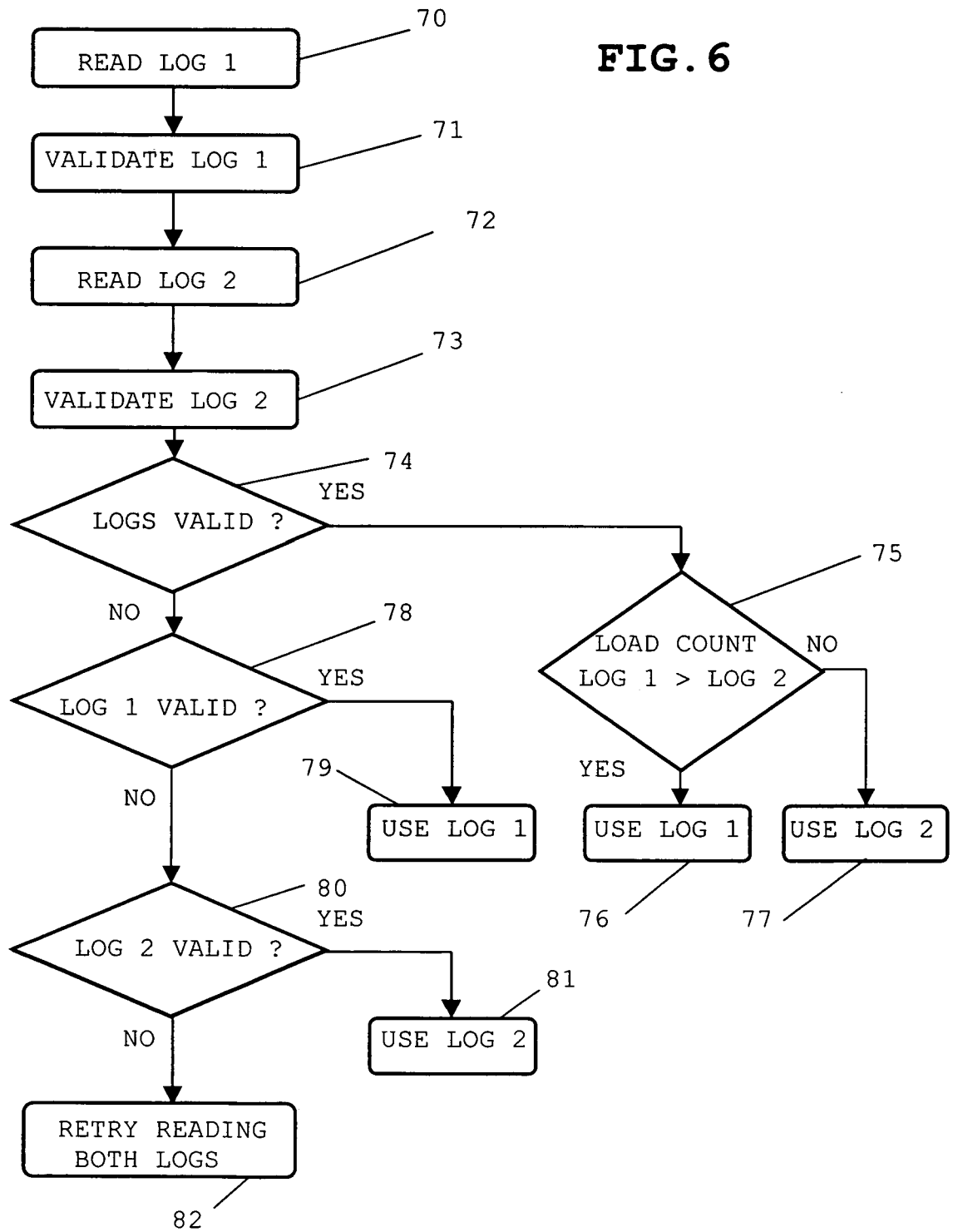
FIG. 6 is a flow diagram of steps to select between system logs recorded on the tape of FIGS. 4 and 5.

Referring now to FIG. 6, upon a tape load, the system log 1 is read in step 70. The process continues to step 71 where the system log 1 is validated and in step 72 the system log 2 is read. The process continues on to step 73 where the system log 2 is validated. The process of validating the system logs is effected by reference to the CRC characters stored in the logs. In step 74, a check is made on the validity of the system logs and, if both logs are found to be valid, the process continues to step 75 where the load counts of the two system logs are compared. If the load count of the system log 1 is greater than that of the system log 2, then system log 1 is selected during a session of tape use in step 76. Conversely, if the load count of the system log 1 is less than that of the system log 2, then system log 2 is selected during a session of tape use in step 77.

If in the step 74, it is determined that the system logs 1 and 2 are not both valid, a check is conducted in step 78 to determine if the system log 1 is valid. If so, the system log 1 is used in step 79. If not, a check is made in step 80 whether the system log 2 is valid. If so, the system log 2 is used in step 81. Finally, if neither of the system logs 1 and 2 is valid, the process moves to step 82 where recovery strategies are attempted to read both the system logs 1 and 2.

The drive controller 12 is programmed to control the drive 20 so that the system log that does not have its information used in a tape session is the log that is updated by being overwritten when the tape is unloaded. In other words, the controller 12 is programmed to update one of the system logs for each usage of the tape, the logs being selected in turn for updating according to which has been used in the tape session. The invention thereby provides the tape with at least one current log of tape usage and at least one log of earlier tape usage. The current log of tape usage is identified by the load count information contained in the log.

When the tape is due to be unloaded, the drive controller 12 calculates the log values and the CRC to write to the log to be updated. If an attempt to update a system log fails, recovery actions are undertaken and a retry is made to update the same system log. No attempt is made to overwrite the other system log. If all recovery actions are exhausted and the system log has still not been successfully updated, the tape is ejected.

Upon a subsequent load of this tape, the tape drive will read both the system logs and will use the latest complete log. If the prior update attempt has corrupted the system log, then the same log information will be used that was used during the previous load as already described and illustrated in FIG. 6.

What has been described is a tape drive that is programmed so that only the oldest or a previously corrupted log is overwritten during a tape unload. This provides more complete assurance that there is always a complete log that can be read on a subsequent load. It will be apparent that although the invention has been described in relation to a format providing two system logs, the system logs may number more than two.

The invention claimed is:

1. Data storage apparatus for storing data on a tape, the apparatus comprising:
   recording means to load the tape for a data recording session and to unload the tape following the data recording session, the recording means being operable to record the data in accordance with a format specifying a system area of the tape for storing a plurality of logs of tape-usage information, and
   a data area of the tape for storing the said data, and control means programmed to access the data in one of the said logs for use at each loading of the tape and to update one of the said logs at each unloading of the tape, the control means being programmed to select the most recently updated log to be accessed at each loading of the tape and to update the least recently updated log at each unloading.

2. Apparatus as claimed in claim 1, wherein the recording means is adapted to record the data in accordance with a format specifying the plurality of logs to be two in number.

3. Apparatus as claimed in claim 1, wherein the said logs contain load count information and the control means is programmed to identify the most recently updated log by reference to the load count information in the logs.

4. Apparatus as claimed in claim 1, wherein the control means is adapted to validate the said logs following a tape load operation.

5. Apparatus as claimed in claim 4, wherein the control means is programmed such that, if the most recently updated log is invalid, the control means will select the same log that was used during the previous load operation.

6. Digital data storage apparatus for storing data on a tape, the apparatus comprising:
   a tape drive to load the tape for a data recording session and to unload the tape following the data recording session, the tape drive being operable to record the data in accordance with a format specifying a system area of the tape for storing two logs of tape-usage information, and a data area of the tape for storing the said data, and a controller programmed to access the data in one of the said logs for use at each loading of the tape and to update one of the said logs at each unloading of the tape, the controller being programmed to identify the most recently updated log to be accessed at each loading of the tape and to update the least recently updated log at each unloading.

7. Digital data storage apparatus as claimed in claim 6, wherein the said logs contain load count information and the controller is programmed to identify the most recently updated log by reference to the load count information in the logs.

8. Digital data storage apparatus as claimed in claim 6, wherein the controller is adapted to validate the said logs following a tape load operation.

9. Digital data storage apparatus as claimed in claim 8, wherein the controller is programmed such that, if the most recently updated log is invalid, the controller will access the same log that was accessed during the previous load operation.

10. Digital data storage apparatus as claimed in claim 8, wherein the controller is programmed to validate the system logs by reference to cyclic redundancy check characters in the system logs.

11. A method of storing data on a tape by means of data storage apparatus operable to load the tape for a data recording session and to unload the tape following the data recording session, the method comprising the steps of:

recording the data in accordance with a format specifying a system area of the tape for storing a plurality of logs of tape-usage information, and a data area of the tape for storing the said data, and accessing the data in one of the said logs for use at each loading of the tape and updating one of the said logs at each unloading of the tape, the most recently updated log being accessed for use at each loading of the tape and the least recently updated log being updated at each unloading of the tape.

12. A method as claimed in claim 11, wherein the data is recorded in accordance with a format specifying the plurality of logs to be two in number.

13. A method as claimed in claim 11, wherein the said logs contain load count information and the most recently updated log is identified by reference to the load count information in the logs.

14. A method as claimed in claim 11, including the further step of validating the said logs following a tape load operation.

15. A method as claimed in claim 14, wherein, if the most recently updated log is invalid, the same log is accessed that was accessed for use during the previous load operation.

16. A method as claimed in claim 14, wherein the system logs are validated by reference to cyclic redundancy check characters in the system logs.

17. A method as claimed in claim 14, wherein reading the system logs is retried following failure to validate one of the system logs.

18. A computer readable storage medium having a program that, when loaded on a computer control system, is effective to control data storage apparatus to store data on a tape loaded in the data storage apparatus for a data recording session and unloaded following the data recording session, the program being effective to control the data recording in accordance with a format specifying a system area of the tape for storing a plurality of logs of tape-usage information, and a data area of the tape for storing the said data, the program comprising instructions to access the data in one of the said logs for use at each loading of the tape and to update one of the said logs at each unloading of the tape, the most recently updated log being accessed for use at each loading of the tape and the least recently updated log being updated at each unloading of the tape.

* * * * *